(12) United States Patent
Peng et al.

(10) Patent No.: US 6,704,362 B2
(45) Date of Patent: Mar. 9, 2004

(54) RESOURCE SCALABLE DECODING

(75) Inventors: Shaomin Peng, Yorktown Heights, NY (US); Cornelis C. Van Zon, Peekskill, NY (US); Zhun Zhong, Croton-on-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 143 days.

(21) Appl. No.: 09/899,880

(22) Filed: Jul. 6, 2001

(65) Prior Publication Data

US 2003/0007566 A1 Jan. 9, 2003

(51) Int. Cl.[7] .............................................. H04N 7/12
(52) U.S. Cl. .......................... 375/240.25; 375/240.15
(58) Field of Search .......................... 348/390.1, 419.1; 375/240.25, 240.12, 240.2, 240.21; 382/232, 233, 253; H04N 11/04

(56) References Cited

U.S. PATENT DOCUMENTS

| | | | |
|---|---|---|---|
| 4,776,014 A | * 10/1988 | Zinser, Jr. ................... | 704/262 |
| 5,767,797 A | * 6/1998 | Yogeshwar et al. ........... | 341/50 |
| 5,956,431 A | * 9/1999 | Iourcha et al. .............. | 382/253 |
| 6,025,878 A | 2/2000 | Boyce et al. | |

FOREIGN PATENT DOCUMENTS

| | | | |
|---|---|---|---|
| EP | 0595218 A1 | 10/1993 | .......... H04N/7/133 |
| EP | 0912063 A2 | 10/1998 | ............ H04N/7/50 |
| WO | WO0068840 | 5/2000 | ............ G06F/17/30 |
| WO | WO0145425 | 12/2000 | ............ H04N/7/50 |

OTHER PUBLICATIONS

M. Mattavelli et al; "Computational Graceful Degradation for Video Sequence Decoding", Image Processing, 1997, Proceedings, International Conference on Santa Barbara, CA, Oct. 26–29, 1997, Los Alamitos, CA, IEEE Comput. Soc, US, pp. 330–333, XP010254175.

* cited by examiner

Primary Examiner—Nhon Diep

(57) ABSTRACT

A complexity scalable decoder system and method. The system comprises: a decoder having a plurality of functional blocks for decoding compressed video data, the decoder further includes a plurality of scalable functions for selectively reducing a complexity of at least one of the functional blocks; and a local resource controller for generating a scaling strategy for the decoder, wherein the scaling strategy is selected in response to a complexity requirement received from a system resource manager, and wherein the scaling strategy is selected from a plurality of predetermined scaling strategies available to the local resource controller. Each of the predetermined scaling strategies may be selected from a look-up table designed off-line.

22 Claims, 4 Drawing Sheets

46

COMPLEXITY REQUIREMENT

| | MEMORY | BANDWIDTH | CPU | FUNCTION | | STRATEGY |
|---|---|---|---|---|---|---|
| 1. | 90% | - | - | - | > | 1. E |
| 2. | 80% | - | - | - | > | 2. E |
| 3. | 70% | - | - | - | > | 3. E |
| 4. | 60% | - | - | - | > | 4. E |
| 5. | 90% | - | - | PIP | > | 5. E+P |
| 6. | 80% | - | - | PIP | > | 6. E+P |
| 7. | - | 85% | - | - | > | 7. MC |
| 8. | - | 70% | - | - | > | 8. MC |
| 9. | - | 60% | - | - | > | 9. MC |
| 10. | - | - | 90% | - | > | 10. A |
| 11. | - | - | 80% | - | > | 11. A+I |
| 12. | - | - | 70% | - | > | 12. E+I |
| 13. | - | - | 90% | PIP | > | 13. A+I+P |
| 14. | 80% | - | 80% | PIP | > | 14. A+E+I+P |

{A=ADAPTIVE B FRAME; I = IDCT SCALING; MC = MOTION COMPENSATION; E = EMBEDDED RESIZING; P = PIP PROCESSING}

FIG. 2

RESOURCE SCALABLE DECODING

BACKGOUND OF THE INVENTION

1. Technical Field

The present invention relates to processing compressed video signals, and more particularly relates to a system and method for implementing a local resource controller for scaling a main-stream decoding process in a media processing core.

2. Related Art

Multimedia processing systems have become a fast growing sector of the consumer electronics marketplace. Standards-based video processing (e.g., MPEG2, MPEG4, H.263, etc.) has become a key component for the success of this industry. Of all the video processing functions, video decoding is typically the most resource-consuming process among all the various processing functions. The video decoding process is carried out pursuant to one of the various standards, which ensures an appropriate output quality level. However, such standards generally assume that the decoder is working with unlimited resources.

At the heart of a multimedia processing system is a media processor core (MPC), which performs all of the processing functions. Often however, the demand for concurrent multimedia processing and decoding functions exceeds the capabilities (i.e., computational power) of the MPC. When this occurs, resources (e.g., CPU cycles, memory size, memory bandwidth, power consumption, etc.) allocated to each individual function become limited. One solution for a system subject to resource constraints is to "scale," i.e., reduce the complexity, of certain processing functions or algorithms. The trade-off of a scaling operation, however, is reduced output quality.

For a resource-limited system, the available computer resources for a particular processing function may change over time depending on the system load. To guarantee the system works in a timely manner, the algorithm complexity levels need to be dynamically adapted to the available resources over time by trading off the output results. Accordingly, a need exists for a scalable decoder that can dynamically adapt to the resource constraints. Moreover, a low-cost, efficient, and resource-constrained complexity scalable video decoder is critical for the next generation multi-functional, multi-purpose multimedia video devices.

SUMMARY OF THE INVENTION

This invention overcomes the above-mentioned problems, as well as others, by providing a complexity scalable decoder system that can dynamically adapt to the resource constraints. In a first aspect, the invention provides a complexity scalable decoder system, comprising: a decoder having a plurality of functional blocks for decoding compressed video data, wherein the decoder further includes a plurality of scalable functions for selectively reducing a complexity of at least one of the functional blocks; and a local resource controller for generating a scaling strategy for the decoder, wherein the scaling strategy is selected in response to a complexity requirement received from a system resource manager, and wherein the scaling strategy is selected from a plurality of predetermined scaling strategies available to the local resource controller.

In a second aspect, the invention provides a method of providing a complexity scalable decoder system in a media processor core having a plurality of processing functions and a resource manager, comprising the steps of: sending a complexity requirement from the resource manager to a local resource controller associated with a scalable decoder; selecting a scaling strategy from a look-up table in response to the complexity requirement; communicating the scaling strategy to the scalable decoder; and reducing a complexity of the scalable decoder based on the communicated scaling strategy.

In a third aspect, the invention provides a program product stored on a recordable medium, which when executed, provides local resource control to a scalable decoder in a media processing core, the program product comprising: program code configured to receive a complexity requirement from a resource manager; program code configured to select a scaling strategy from a plurality of predetermined scaling strategies based on the received complexity requirement; and program code configured to communicate the selected scaling strategy to the scalable decoder.

BRIEF DESCRIPTION OF THE DRAWINGS

The preferred exemplary embodiment of the present invention will hereinafter be described in conjunction with the appended drawings, where like designations denote like elements, and:

FIG. 2 depicts a look-up table in accordance with the present invention.

DETAILED DESCRIPTION OF THE INVENTION

1. Overview

For the purposes of this disclosure, an embodiment utilizing an MPEG2 video decoder is used to describe the invention. However, it should be understood that the invention, is applicable to any decoding system that has a similar architecture. Standard MPEG2 video decoders, which are well known in the art, decode an MPEG2 video bitstream using four functional blocks and an adder. The functional blocks are the variable length decoder (VLD), the inverse scan and inverse quantization (IQ), the inverse discrete cosine transform (IDCT) and the motion compensation (MC). The MPEG2 decoder uses two frame-buffers for reference frame storage. In general, the higher the frame resolution, the more decoding resources (memory size, memory bandwidth, and the computational complexity) are demanded. Various schemes for scaling MPEG2 decoders have been proposed, and some are discussed in further detail below.

Figure 1:
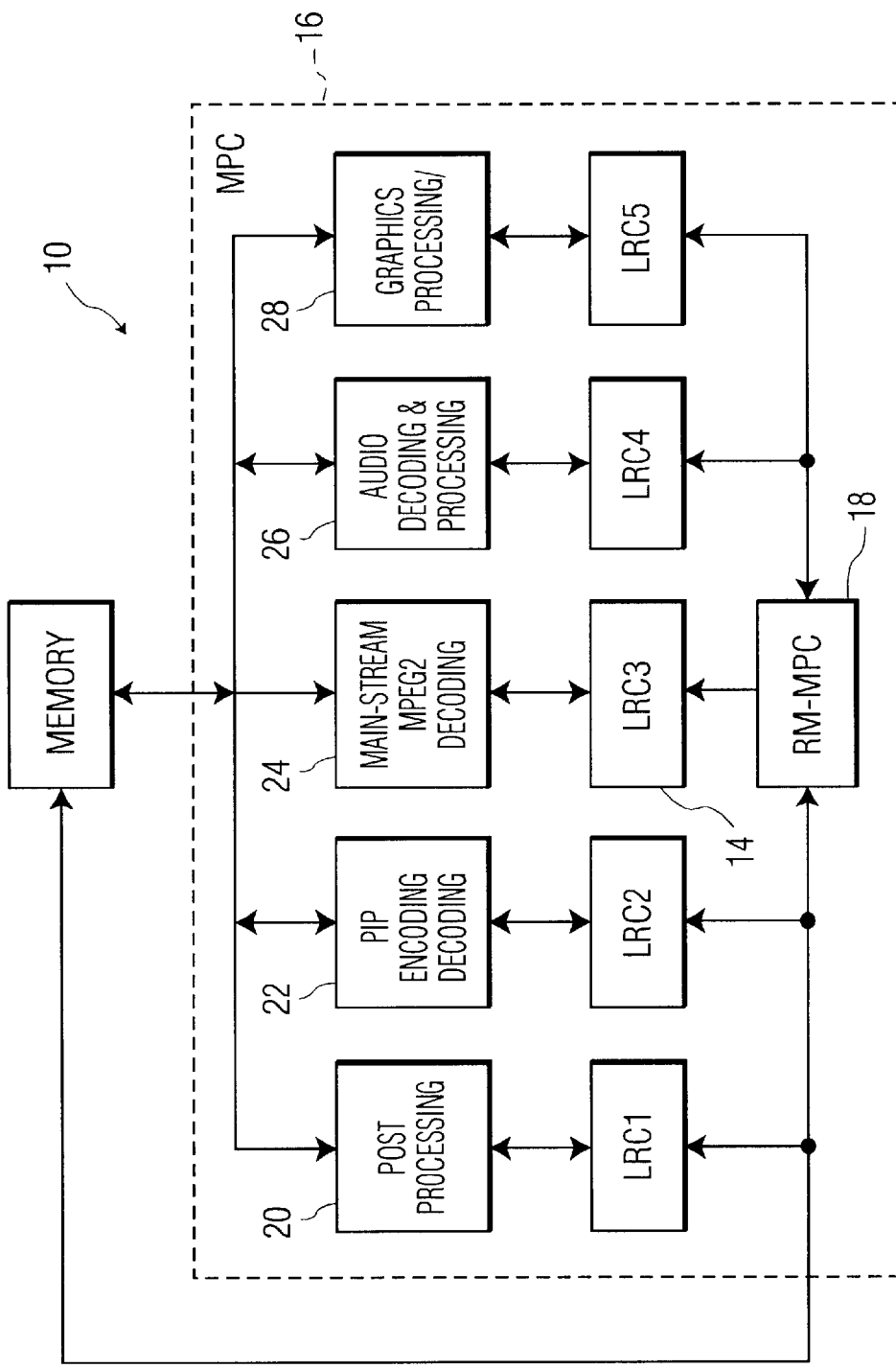
FIG. 1 depicts a block diagram of a media processor core in accordance with the present invention.

Referring to FIG. 1, an overall system diagram 10 is shown containing various multimedia-processing functional units 20, 22, 24, 26, 28, each with its own local resource controller (LRC1–LRC5). The media processor core (MPC) resource manager 18 (referred to herein as "RM-MPC" or "resource manager") controls each functional unit through the unit's local resource controller. RM-MPC 18 may, for instance, comprise a quality of service manager and a strategy manager. RM-MPC 18 monitors the resource usage of all functional units on the system 10 and distributes the resources dynamically to each individual functional unit. Thus, when one of the functional units demands more resources, RM-MPC 18 weighs the priority of the demands and redistributes the overall resources. MPC 16 then withdraws the power from certain functional units (e.g., eliminate some complicated post-processing, produce lower output audio quality, or reduce the computational loads for the main stream MPEG2 decoding) in favor of others.

2. Resource Scalable Decoding

A feature of this invention is to provide a resource scalable decoding system. In this exemplary embodiment, the resource scalable decoding system is implemented by LRC3 14 and main-stream MPEG2 decoding 24. In a conventional operational mode, the resource distribution for each of the functional units uses a default design, which typically does not lead to any resource conflicts with the main-stream MPEG2 decoding process (i.e., decoder) 24. For example, PIP (picture-in-picture) encoding/decoding 22 is not always activated while the main-stream decoding 24 is performed. However, in instances when functional units other than the main-stream decoding unit 24 demand significant resources, resource scalable MPEG2 decoding can be activated by LRC3 14 to reduce resource usage by main-stream decoding 24. For example, when a viewer wants to record the PIP in a storage space in a high quality format (e.g., MPEG2 or MPEG4), the PIP encoder 22 gets higher resource priority and the main-stream decoding 24 may have to be scaled to reduce its consumption of resources.

LRC3 14, which is associated with main-stream decoder 24, receives the resource budget dynamically from the RM-MPC 18 and redistributes the received resources to each individual functional block within the decoder. LRC3 14 thus decides locally how to allocate resources for the decoding process using one or more possible scaling strategies. Scaling strategies are selected and controlled by LRC3 via a look-up-table, which is described in detail below with respect to FIGS. 2 and 3.

3. Look-Up Table

Scaling strategies are derived through off-line experimentation and are then listed in a scalability look-up table. To create the look-up table, the designer is provided with a number of available scaling functions or algorithms. Each scaling function reduces the complexity of one of the functional blocks of the decoder in exchange for reduced output quality. Examples of such scaling functions that are incorporated by reference include: (1) adaptive B-frame scaling, such as that disclosed in co-pending U.S. patent application Ser. No. 09/821,140, entitled "SCALABLE MPEG-2 VIDEO DECODER" and filed on Mar. 29, 2001 (2) IDCT scaling, such as that disclosed in co-pending U.S. patent application Ser. No. 09/759,042, entitled "SCALABLE MPEG-2 DECODER" and filed on Jan. 11, 2001; (3) motion compensation scaling, such as that disclosed in co-pending U.S. patent application Ser. No. 09/709,260, entitled "SCALABLE MPEG-2 VIDEO DECODER WITH SELECTIVE MOTION COMPENSATION" and filed on Jan. 9, 2001; embedded resizing scaling, such as that disclosed in co-pending U.S. patent application Ser. No. 09/867,970, entitled VERTICAL SCALING OF INTERLACED VIDEO IN THE FREQUENCY DOMAIN, and filed on May 30, 2001. Other scaling strategies, such as special PIP processing routines, which optimize picture-in-picture processing, could likewise be utilized. Thus, it should be understood that the scaling functions listed above are for exemplary purposes only, and other scaling functions could likewise be implemented.

The scalability look-up-table is set up to determine a scaling strategy for each possible complexity requirement. Each complexity requirement comprises limitations placed on one or more complexity resources. For example, a complexity requirement may dictate that bandwidth consumption must be decreased to below 80% and CPU processing power must be decreased to below 90%.

The designer knows beforehand to what quality level each individual decoder block can be scaled, and in what situation. For example, in the case where PIP is activated, special PIP processing routines can be utilized to reduce complexity by a known percentage. For each complexity requirement, the designer tries various possible combinations of the different scalable functions to achieve the best result. Of all the strategies that meet the complexity requirements, the designer selects the strategy that corresponds to the best subjective quality level for that particular complexity level. This process is repeated for each complexity requirement until the complexity look-up table is complete.

An exemplary look-up table 46 is shown in FIG. 2. On the left hand side of FIG. 2 are 14 various complexity requirements. For example, complexity requirement "1." recites a memory reduction having an upper bound of 90% (i.e., thus requiring a 10% or more reduction); complexity requirement "7." recites a bandwidth reduction having an upper bound of 85%; complexity requirement "14." recites a memory reduction having an upper bound of 80%, CPU reduction having an upper bound of 80%, and picture in picture (PIP) active; etc. For each complexity requirement, there exists a corresponding scaling strategy (listed on the right hand side). In this example, different combinations of five scaling functions are utilized, namely, A=adaptive B frame scaling; I=IDCT scaling; MC=motion compensation scaling; E=embedded resizing; and P=PIP processing. Thus, for instance, embedded resizing E is used for complexity requirements "1–4." Alternatively, a combination of adaptive B frame (A), IDCT scaling (I), embedded resizing (E), and PIP processing (P) is used for complexity requirement "14."

It should be recognized that the table depicted in FIG. 2 is for exemplary purposes only. Thus, the number of entries; the complexity ranges; the types of complexities (memory, bandwidth, CPU, function); the combination of complexities; the combination of scaling functions; types of scaling functions; etc., are all for exemplary purposes and should not be limiting to the invention. For example, the table could also include battery power consumption. Moreover, variations of each of the scaling functions could be used. For example, there could be more than one variation of IDCT scaling. Furthermore, the table itself may be implemented in any known format, including as a database, as program code, as a data object, etc.

4. Data Dependent Strategies

The above described look-up table comprises a data independent strategy, which means that the required complexity level can be achieved by the corresponding strategy regardless of the data characteristics. The present invention may also include a data dependent strategy system that can dynamically refine or change the scaling strategy based on the characteristics of the data being processed by the decoder. The data dependent strategies may be incorporated into the above-mentioned look-up table, or be handled by a separate system and/or look-up table. Two exemplary data dependent strategies for complexity reduction are described as follows.

The first case involves output quality degradation. Specifically, if the output quality is worse than the viewer can accept, then the selected strategy needs to be altered to improve the quality. An objective quality measurement (e.g., an examination of data) can be used to determine acceptable output quality. If the quality measurement falls below the threshold, then the local resource controller can dynamically change the scaling strategy. For example, if the output quality was unacceptable after using the IDCT scaling algorithm in the decoding loop to achieve an 80% complexity level, the system could dynamically refine the strategy by reducing the B picture size to one half and then alter the IDCT scaling algorithm to further reduce the IDCT complexity to achieve the required 80% complexity level. The final picture size could be re-scaled after the decoding loop with much less complexity.

The second case involves further simplifying the selected scaling strategy in light of the data characteristics. For example, if the DCT data for a sequence is identified as "sparse" (i.e., containing a small amount of non-zero data), the IDCT scaling algorithm could be instructed to provide a very low complexity level. Thus, for example, an originally requested 80% complexity could be further reduced without any output quality degradation.

It should be understood that the two cases described above are for exemplary purposes only, and other data dependent strategies could be implemented.

5. Resource Scalable Decoding System

Figure 3:
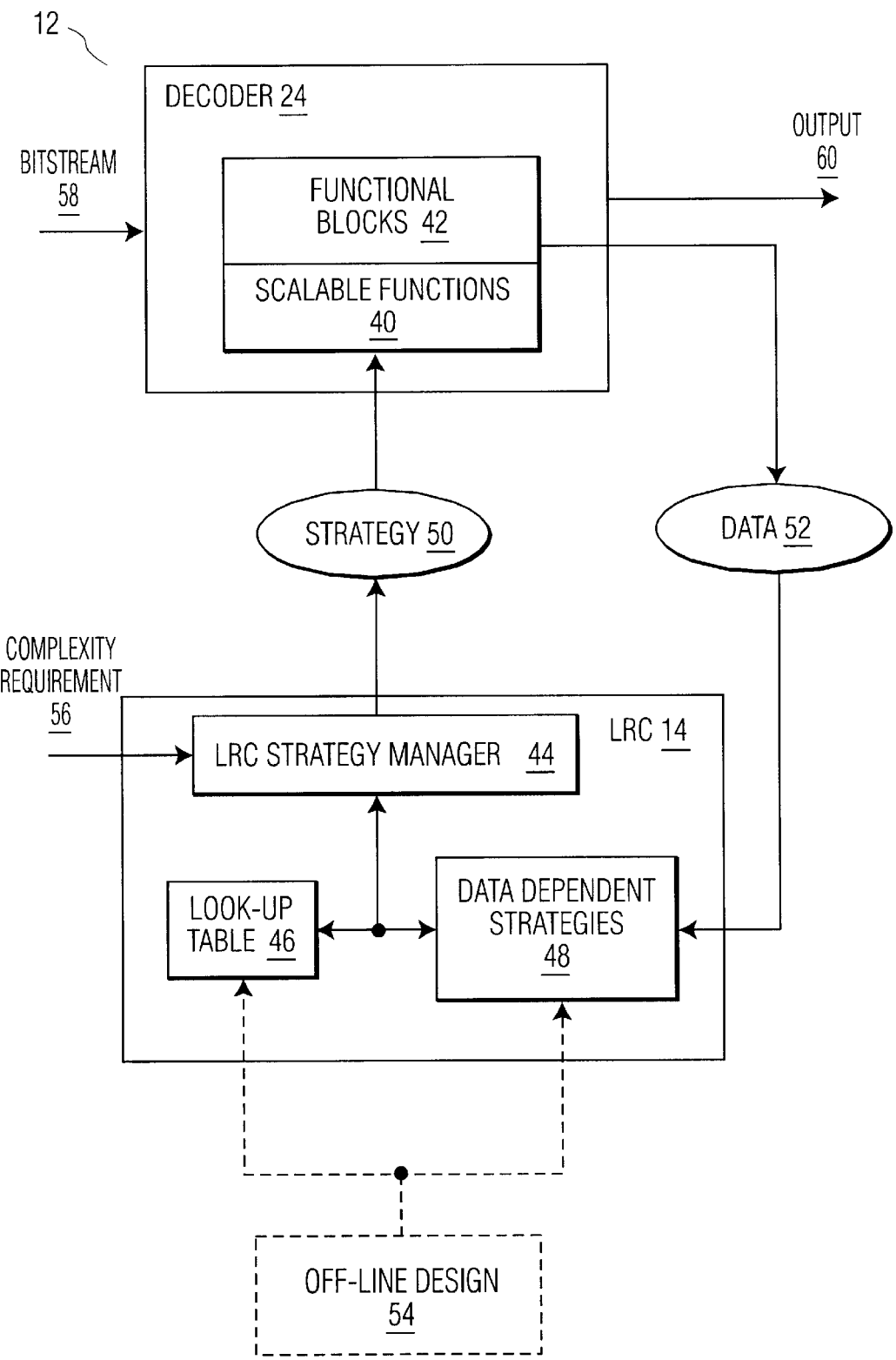
FIG. 3 depicts a resource scalable decoding system in accordance with a preferred embodiment of the present invention.

Referring now to FIG. 3, an exemplary complexity scalable decoding system 12 is shown comprising a decoder 24, a local resource control (LRC) 14 and an offline design system 54. Decoder 24 includes functional blocks 42 that make up a typical decoder (e.g., VLD, IQ, IDCT, and MC). Accordingly, decoder 24 receives a bitstream 58 and generates an output 60. Bitstream 58 may comprise, for example, discrete cosine transform (DCT) data, and output 60 may comprise a pixel based video image. Decoder 24 also includes scalable functions 40 that can be utilized to reduce the complexity of functional blocks 42. While some examples of scalable functions 40, including adaptive B frame scaling, IDCT scaling, embedded resizing, motion compensation scaling, and PIP processing, are described above, it should be recognized that other scaling function could be used and therefore fall within the scope of this invention.

Strategy 50 determines which scalable functions to call to implement scalable decoder based on LRC 14. LRC 14 determines the strategy 50 as follows. First, the LRC strategy manager 44 receives a complexity requirement 56 from the resource manager. The LRC strategy manager 44 then examines look-up table 46 to select the appropriate strategy for the submitted requirement 56. An exemplary look-up table is described above with reference to FIG. 2. Once the appropriate strategy 50 is selected, it is submitted to decoder 24 for implementation.

LRC 14 also includes a data dependent strategy system 48. Data dependent strategy system 48 can alter or refine the selected strategy 50 based on data 52 that is being processed by the functional blocks 42 of decoder 24. Examples of data dependent strategies, which are described above, include: (1) comparing an output quality to a threshold, and (2) determining if the amount of non-zero data falls below a threshold.

As noted above, look-up table 46 and data dependent strategies 48 are designed offline by offline design system 54. Strategies can be obtained through a trial and error process in which the designer subjectively examines output quality and/or through automated applications, such as that disclosed in co-pending application Ser. No. 09/817,981, filed on Mar. 27, 2001 (incorporated by reference).

It should be understood that look-up table 46 should be interpreted broadly, and need not actually comprise a physical table. Look-up table 46 may therefore include any system for selecting scaling strategies based on a received complexity requirement. For example, table 46 could comprise "if-then-else" or "case" program code statements.

6. Exemplary Strategy

Figure 4:
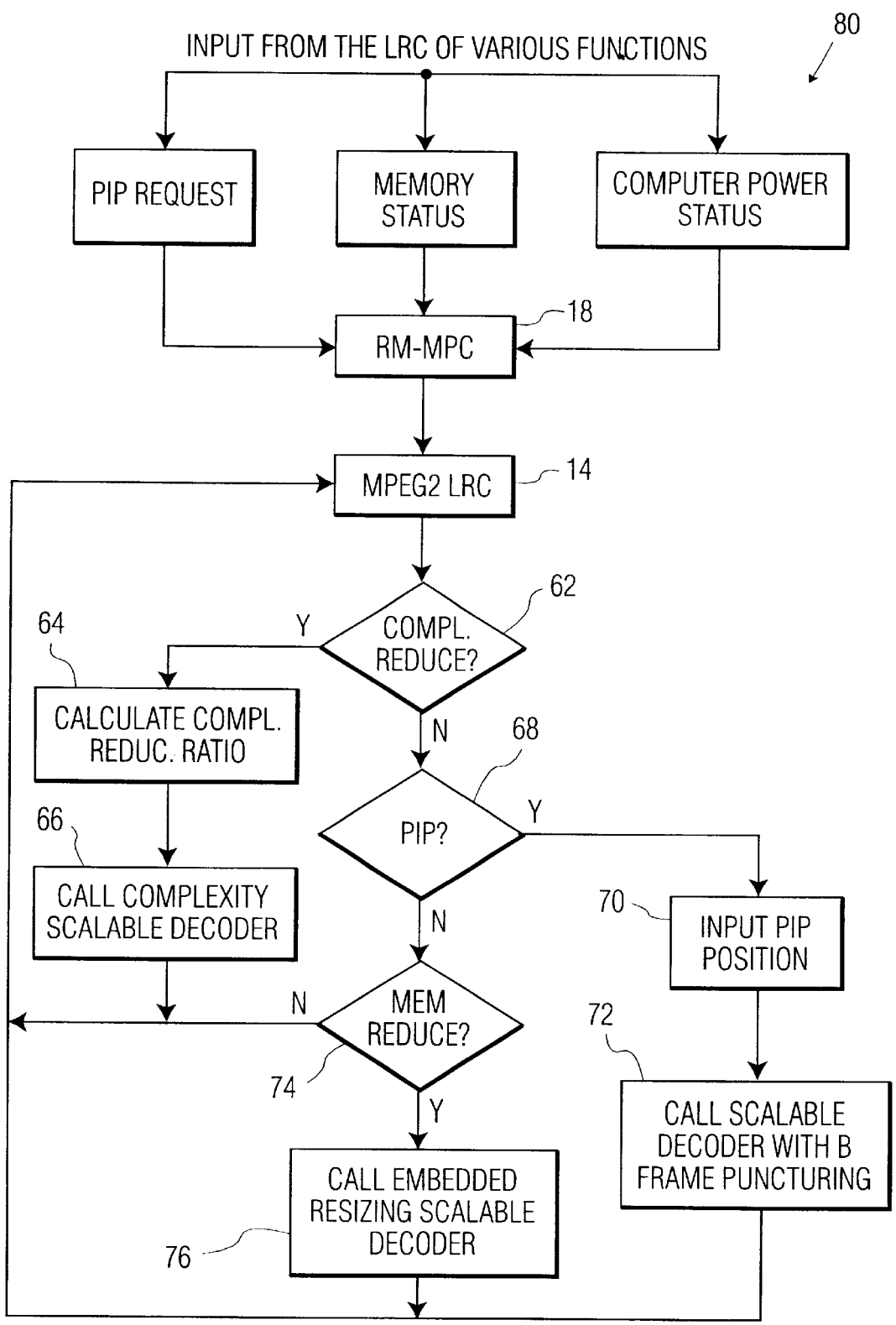
FIG. 4 depicts an exemplary flow chart of a scalable decoding system.

Referring now to FIG. 4, an exemplary scalable decoding operation 80 is shown. First, a resource manager 18 receives resource information from the system, including a PIP request, a memory status, and a computer power status. The resource manager 18 then submits a complexity requirement to the MPEG2 decoder LRC 14 regarding any resource constraints. Next, LRC 14 determines if the decoder complexity needs to be reduced 62. If it does need to be reduced, a complexity reduction ratio is calculated 64 and the necessary complexity scalable functions in the decoder are called 66. If no complexity reduction is required, then LRC 14 inquires whether there is a PIP request 68. If there is a PIP request, LRC 14 will input the PIP position 70 and call a scalable decoder function with B frame PIP processing 72. If no PIP request is made, LRC 14 will determine whether there is a memory reduction requirement 74. If there is a memory reduction requirement, an embedded resizing scaling function within the decoder 76 will be called.

It is understood that systems and methods described herein can be implemented in hardware, software, or a combination of hardware and software. They may be implemented by any type of computer system—or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. The embodiments are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims. For instance, although the description provided herein generally relates to MPEG-2 decoders, it is understood that the invention can be applied similar systems using standards such as MPEG1, MPEG4, H.26L, H.261, and H.263.

What is claimed is:

1. A complexity scalable decoder system, comprising:
   a decoder having a plurality of functional blocks for decoding compressed video data, wherein the decoder further includes a plurality of scalable functions for selectively reducing a complexity of at least one of the functional blocks; and a local resource controller for generating a scaling strategy for the decoder, wherein the scaling strategy is selected in response to a complexity requirement received from a system resource manager, and wherein the scaling strategy is selected from a plurality of predetermined scaling strategies available to the local resource controller.

2. The complexity scalable decoder system of claim 1, wherein the plurality of predetermined scaling strategies are listed in a look-up table.

3. The complexity scalable decoder system of claim 1, wherein the plurality of predetermined scaling strategies are designed off-line.

4. The complexity scalable decoder system of claim 1, wherein each of the plurality of predetermined scaling strategies instructs at least one of the scalable functions how to reduce the complexity of the decoder.

5. The complexity scalable decoder system of claim 4, wherein the complexity of the decoder is selected from the group consisting of: CPU process power requirements, bandwidth requirements, power consumption requirements, and memory requirements.

6. The complexity scalable decoder system of claim 4, wherein at least one of the plurality of predetermined scaling strategies includes a strategy for handling a picture-in-picture request made to the resource manager.

7. The complexity scalable decoder system of claim 6, wherein the scaling strategy for handling the picture-in-picture request includes a picture-in-picture scaling function.

8. The complexity scalable decoder system of claim 1, wherein the scalable functions are selected from the group consisting of: adaptive B frame scaling, IDCT scaling, motion compensation scaling, and embedded resizing.

9. The complexity scalable decoder system of claim 1, wherein the local resource controller further includes a data dependent strategy system that examines data being processed by the decoder and alters the selected scaling strategy when an output complexity level falls below a predetermined threshold.

10. The complexity scalable decoder system of claim 9, wherein the data dependent strategy system includes a system for determining if an output quality falls below the predetermined threshold.

11. The complexity scalable decoder system of claim 9, wherein the data dependent strategy system includes a system for determining if the amount of non-zero DCT data being processed by the decoder falls below the predetermined threshold.

12. A method of providing a complexity scalable decoder system in a media processor core having a plurality of processing functions and a resource manager, comprising the steps of:

sending a complexity requirement from the resource manager to a local resource controller associated with a scalable decoder;

selecting a scaling strategy from a look-up table in response to the complexity requirement;

communicating the scaling strategy to the scalable decoder; and reducing a complexity of the scalable decoder based on the communicated scaling strategy.

13. The method of claim 12, comprising the further steps of:

examining data being processed by the decoder; and altering the scaling strategy if the examined data breaches a predetermined threshold.

14. The method of claim 13, wherein the examined data includes an output quality level.

15. The method of claim 13, wherein the examined data includes an amount non-zero data.

16. The method of claim 12, comprising the preliminary steps of:

in an offline mode, determining a preferred scaling strategy for each of a plurality of complexity reduction requests; and generating the look-up table based on the preferred strategies.

17. The method of claim 12, wherein the selected scaling strategy includes at least one scaling function that performs a complexity reduction selected from the group consisting of: power consumption reduction, memory size reduction, bandwidth reduction, and processing power reduction.

18. A program product stored on a recordable medium, which when executed, provides local resource control to a scalable decoder in a media processing core, the program product comprising:

program code configured to receive a complexity requirement from a resource manager;

program code configured to select a scaling strategy from a plurality of predetermined scaling strategies based on the received complexity requirement; and program code configured to communicate the selected scaling strategy to the scalable decoder.

19. The program product of claim 18, further comprising:

program code configured to analyze data received from the decoder; and program code configured to alter the selected scaling strategy if the analyzed data breaches a predetermined threshold.

20. The program product of claim 18, further comprising a look-up table that includes each of the plurality of predetermined scaling strategies.

21. The program product of claim 20, wherein each of the plurality of predetermined scaling strategies includes an associated complexity requirement in the look-up table.

22. The program product of claim 18, wherein the plurality of predetermined scaling strategies include scaling functions selected from the group consisting of: adaptive B frame scaling, IDCT scaling, embedded resizing, motion compensation scaling, and PIP processing.

* * * * *